(12) United States Patent
Rohé

(10) Patent No.: US 11,623,973 B2
(45) Date of Patent: *Apr. 11, 2023

(54) MINERAL OIL BARRIER

(71) Applicant: Omya International AG, Oftringen (CH)

(72) Inventor: Ramon Rohé, Suhr (CH)

(73) Assignee: Omya International AG, Oftringen (CH)

( * ) Notice: Subject to any disclaimer, the term of this patent is extended or adjusted under 35 U.S.C. 154(b) by 301 days.

This patent is subject to a terminal disclaimer.

(21) Appl. No.: 16/488,267

(22) PCT Filed: Feb. 16, 2018

(86) PCT No.: PCT/EP2018/053896
§ 371 (c)(1),
(2) Date: Aug. 23, 2019

(87) PCT Pub. No.: WO2018/153786
PCT Pub. Date: Aug. 30, 2018

(65) Prior Publication Data
US 2021/0139661 A1 May 13, 2021

Related U.S. Application Data

(60) Provisional application No. 62/466,421, filed on Mar. 3, 2017.

(30) Foreign Application Priority Data

Feb. 24, 2017 (EP) .................................... 17157947

(51) Int. Cl.
| | | |
|---|---|---|
| C08F 220/10 | (2006.01) | |
| C08F 220/02 | (2006.01) | |
| C08F 251/00 | (2006.01) | |
| C08K 3/26 | (2006.01) | |
| C08J 7/046 | (2020.01) | |
| C08J 7/048 | (2020.01) | |
| C08J 7/052 | (2020.01) | |
| C08J 7/04 | (2020.01) | |
| C08F 220/18 | (2006.01) | |
| C08F 2/22 | (2006.01) | |

(52) U.S. Cl.
CPC ............. *C08F 251/00* (2013.01); *C08F 2/22* (2013.01); *C08F 220/1802* (2020.02); *C08J 7/046* (2020.01); *C08J 7/048* (2020.01); *C08J 7/0427* (2020.01); *C08J 7/052* (2020.01); *C08K 3/26* (2013.01); *C08K 2003/265* (2013.01)

(58) Field of Classification Search
CPC ... C08F 251/00; C08K 3/26; C08K 2003/265; C08K 2201/014; C09D 151/00; C09D 151/02
See application file for complete search history.

(56) References Cited

U.S. PATENT DOCUMENTS

| | | | |
|---|---|---|---|
| 4,442,148 A | 4/1984 | Stierli | |
| 4,595,611 A | 6/1986 | Quick et al. | |
| 6,787,245 B1 | 9/2004 | Hayes | |
| 2004/0020410 A1 | 2/2004 | Gane et al. | |
| 2004/0254332 A1 | 12/2004 | Hayes | |
| 2006/0009610 A1 | 1/2006 | Hayes | |
| 2015/0274350 A1* | 10/2015 | Seyffer | B65D 5/00 428/34.3 |
| 2017/0073901 A1* | 3/2017 | Ohr | D21H 19/38 |

FOREIGN PATENT DOCUMENTS

| | | | | |
|---|---|---|---|---|
| EP | 1712523 A1 | 10/2006 | | |
| EP | 1712597 A1 | 10/2006 | | |
| EP | 1770215 A1 | 4/2007 | | |
| EP | 2264108 A1 | 12/2010 | | |
| EP | 2264109 A1 * | 12/2010 | ............. | C09C 1/022 |
| EP | 2264109 A1 | 12/2010 | | |
| EP | 2371766 A1 | 10/2011 | | |
| EP | 2447213 A1 | 5/2012 | | |
| EP | 2524898 A1 | 11/2012 | | |
| EP | 2915919 A1 | 9/2015 | | |
| EP | 2949813 A1 | 12/2015 | | |
| EP | 3192838 A1 * | 7/2017 | | |
| EP | 3275947 A1 * | 1/2018 | | |
| WO | 2000039222 A1 | 7/2000 | | |
| WO | 2004083316 A1 | 9/2004 | | |
| WO | 2005121257 A2 | 12/2005 | | |
| WO | 2009074492 A1 | 6/2009 | | |

(Continued)

OTHER PUBLICATIONS

International Search Report from PCT/EP2018/053896 dated Mar. 23, 2018, 3 pages.
Written Opinion from PCT/EP2018/053896 dated Mar. 23, 2018, 7 pages.
EP 1770215 A1 (Apr. 4, 2007)—English-language abstract from Espacenet, 1 page.
BfR report No. 008/2010, dated Dec. 9, 2009, "Transfers of mineral oil from packaging materials to food", 6 pages.
Bhunia et al. (2013) "Migration of Chemical Compounds from Packaging Polymers during Microwave, Conventional Heat Treatment, and Storage" Comprehensive reviews in food science and food safety, vol. 12, Issue 5, pp. 523-545.

(Continued)

*Primary Examiner* — Karuna P Reddy
(74) *Attorney, Agent, or Firm* — ALGM LLP; Harry J. Guttman

(57) ABSTRACT

The present invention relates to packaging material comprising a plastic substrate comprising at least one surface, and a barrier layer for hydrophobic substances, wherein the barrier layer is in contact with the at least one surface of the plastic substrate, wherein the barrier layer comprises a copolymer, a surface-reacted calcium carbonate, and a mineral material selected from natural ground calcium carbonate and/or precipitated calcium carbonate, as well as a method for producing the same and its use.

22 Claims, 2 Drawing Sheets

(56) References Cited

FOREIGN PATENT DOCUMENTS

| WO | 2012168433 A1 | 12/2012 |
| WO | 2013083504 A1 | 6/2013 |
| WO | 2013142473 A1 | 9/2013 |
| WO | 2013160199 A1 | 10/2013 |
| WO | WO-2015132101 A1 * | 9/2015 |

OTHER PUBLICATIONS

EFSA Panel on Contaminants in the Food Chain (CONTAM), "Scientific opinion on mineral oil hydrocarbons in food", EFSA Journal, 2012, vol. 10, No. 6, 2704 (185 pages).

Gane et al. (1996) "Void Space Structure of Compressible Polymer Spheres and Consolidated Calcium Carbonate Paper-Coating Formulations", Industrial and Engineering Chemistry Research, vol. 35, No. 5, pp. 1753-1764.

Lorenzini et al. (2013) "Migration kinetics of mineral oil hydrocarbons from recycled paperboard to dry food: monitoring of two real cases" Food Additives & Contaminants: Part A, vol. 30, No. 4, pp. 760-770.

BfR report No. 008/2010, dated Dec. 9, 2009, "Transfers of mineral oil from packaging materials to food", English language translation, 8 pages.

* cited by examiner

MINERAL OIL BARRIER

The invention relates to a packaging material comprising a plastic substrate and a barrier layer for hydrophobic substances, a method of producing the same, and its use.

Currently, paper and cardboard containing recycled fibers are widely used as food packaging materials. During the process of recycling, however, mineral oils originating from printing inks as typically used in offset or oil-based flexographic printing, for example, for newsprint, magazines and general packaging, may find their way into the paper or cardboard. If food is packaged into such materials, the mineral oil contaminants can migrate into the food in relatively large quantities. In order to avoid such food contamination, it was suggested to protect the food within the packaging material by a proper barrier, for example, an inner plastic bag or a plastic film on the inner side of the packaging material.

However, it has been found that internal plastic bags such as polypropylene bags do not prevent migration from an external cardboard packaging (cf. Lorenzini et al., Food Additives & Contaminants: Part A, 2013, 30, 760).

Moreover, it has been found that chemical compounds that are incorporated within plastic packaging materials to improve functionality, may interact with food components during processing or storage and migrate into the food as well. Possible chemical migrants include plasticizers, antioxidants, thermal stabilizers, slip compounds, and monomers. It was found, for example, that antioxidants and their degradation products may migrate from polypropylene and polyethylene packaging materials into food during processing and storage. Bisphenol A can migrate from linings and polycarbonate bottles into food, and may act as an endocrine disruptor, which causes developmental and neurological impacts. Polyethylene terephthalate (PET) is known to contain small amounts of low-molecular weight oligomers of cyclic compounds, which can migrate into the food (cf. Bhunia et al., Comprehensive reviews in food science and food safety, 2013, 12, 523).

The problem of migration of mineral oil and other contaminants into food is a subject of intense debates in the whole packaging market, since the German Federal Institute for Risk Assessment (BfR) has classified the potential health risk as critical (see BfR report no. 008/2010, dated 9 Dec. 2009). The opinion of the BfR was confirmed in 2012 by the European Food Safety Authority (EFSA) (see EFSA Panel on Contaminants in the Food Chain (CONTAM), "Scientific opinion on mineral oil hydrocarbons in food", EFSA Journal 2012, 10(6), 2704). For this reason, no detectable migration of mineral oil to food should be allowed to take place. Other unwanted substances, at least in Europe, include 2,6-diisopropylnaphthalene and bisphenol A, originating from carbonless papers, as well as polyolefin oligomeric saturated hydrocarbon (POSH) coming from polyethylene or polypropylene packaging materials, or polyalphaolefin (PAO).

WO 2012/168433 A1 discloses a packaging material having at least one barrier layer for hydrophobic compounds comprising a cross-linked polyvinyl alcohol. The use of polyvinyl alcohols or ethylene/vinyl alcohols as additive to cellulose-based fiber materials for reduction of the migration of oil out of the fiber material is described in WO 2013/160199 A1. Polyvinyl alcohols are water soluble, and thus, usually have to be cross-linked in order to provide a stable barrier layer. Many cross-linkers, however, release or are contaminated with harmful substances such as formaldehyde, aldehyde, or glyoxal, and therefore, may bear additional potential health risks.

EP 1 770 215 A1 relates to a packaging material comprising a moisture and/or grease resistant barrier layer made from a re-dispersible polymer. An improved pre-formed, sheet-like flexible laminate comprising an oil-impermeable polymeric coating is disclosed in U.S. Pat. No. 4,442,148 A. U.S. Pat. No. 6,787,245 B1 describes sulfonated aliphatic-aromatic copolyesters which are useful in forming coatings or films on various substrates. Articles including films, coatings or laminates of aliphatic-aromatic polyetherester compositions are disclosed in US 2004/0254332 A1.

US 2006/0009610 A1 is concerned with certain sulfonated copolyetherester compositions containing hydroxyalkanoic acids, which may be used to produce shaped articles. An ink-printed ovenable food container comprising a coating of a sulfonated polyester is described in U.S. Pat. No. 4,595,611 A.

EP 2 915 919 A1 relates to a barrier layer for packaging materials produced from a liquid coating composition comprising at least one terephthalate ionomer comprising anionic substituents selected from sulfonate, carboxylate and/or phosphate groups, wherein the at least one terephthalate ionomer has an acid value of at least 1 mg KOH/g ionomer, at least one calcium carbonate containing filler, and a buffer.

In view of the foregoing, providing further plastic packaging materials which can prevent the migration of mineral oils and other contaminants into the packed food or other packed products remains of interest to the skilled man.

Accordingly, it is an object of the present invention to provide a barrier layer for a plastic packaging material, which can prevent the migration of hydrophobic substances such as mineral oils, plasticizers or other hydrophobic contaminants into the packed food. It is also an object of the present invention to provide a process for producing a packaging material comprising such a barrier layer. It is also desirable that said packaging material can be produced easily and cost-efficiently. It is particularly desirable that blocking, which is a common problem during production of polymeric films and coating, is avoided or at least reduced. It is also desirable that said packaging material can be produced on a conventional production unit for packaging materials and can be applied by techniques such as printing or spraying.

Moreover, it is desirable that the process can be used to equip three-dimensional packaging materials such as containers or bottles with a barrier layer.

It is also an object of the present invention to provide a barrier layer that does not release toxic or harmful substances, is not water dissolvable and is recyclable. It is also desirable to provide a barrier layer that contains a reduced amount of polymer and contains materials that are obtainable from renewable raw materials.

The foregoing and other objects are solved by the subject-matter as defined herein in the independent claims.

According to one aspect of the present invention, a packaging material is provided comprising
 a plastic substrate comprising at least one surface, and
 a barrier layer for hydrophobic substances, wherein the
  barrier layer is in contact with the at least one surface
  of the plastic substrate, and
 wherein the barrier layer comprises
  (I) a copolymer obtainable by emulsion polymerization of
   (i) one or more principal monomers selected from the group consisting of $C_1$-$C_4$ alkyl (meth)acrylates, and (ii) 0.1 to 5 wt.-% of one or more acid monomers, wherein the glass transition temperature $T_g$ of the copolymer is from −10 to 70° C., and the emulsion polymerization is carried out in an aqueous medium in the presence of at least one carbohydrate compound, (II) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and (III) a mineral material selected from natural ground calcium carbonate and/or precipitated calcium carbonate, wherein the weight ratio of the surface-reacted calcium carbonate to the mineral material is from 1:10 to 1:0.01.

According to a further aspect of the present invention, a method for producing a packaging material is provided, comprising the steps of:

A) providing a plastic substrate comprising at least one surface,

B) providing a liquid barrier layer composition,

C) applying the liquid barrier layer composition onto the at least one surface of the plastic substrate to form a barrier layer for hydrophobic substances, and D) drying the barrier layer, wherein the liquid barrier layer composition comprises (I) a copolymer obtainable by emulsion polymerization of (i) one or more principal monomers selected from the group consisting of $C_1$-$C_4$ alkyl (meth)acrylates, and (ii) 0.1 to 5 wt.-% of one or more acid monomers, wherein the glass transition temperature $T_g$ of the copolymer is from −10 to 70° C., and the emulsion polymerization is carried out in an aqueous medium in the presence of at least one carbohydrate compound, (II) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and (III) a mineral material selected from natural ground calcium carbonate and/or precipitated calcium carbonate, wherein the weight ratio of the surface-reacted calcium carbonate to the mineral material is from 1:10 to 1:0.01.

According to still another aspect of the present invention, use of a packaging material according to the present invention in food packaging applications, medical device packaging applications, or pharmaceutical packaging applications is provided.

According to still another aspect of the present invention, use of a composition as barrier layer for a plastic substrate is provided, wherein the barrier layer prevents migration of hydrophobic substances, and wherein the barrier layer comprises (I) a copolymer obtainable by emulsion polymerization of (i) one or more principal monomers selected from the group consisting of $C_1$-$C_4$ alkyl (meth)acrylates, and (ii) 0.1 to 5 wt.-% of one or more acid monomers, wherein the glass transition temperature $T_g$ of the copolymer is from −10 to 70° C., and the emulsion polymerization is carried out in an aqueous medium in the presence of at least one carbohydrate compound, (II) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and (III) a mineral material selected from natural ground calcium carbonate and/or precipitated calcium carbonate, wherein the weight ratio of the surface-reacted calcium carbonate to the mineral material is from 1:10 to 1:0.01.

Advantageous embodiments of the present invention are defined in the corresponding sub-claims.

According to one embodiment the plastic substrate is a plastic film, a plastic sheet, a plastic foil, a semi-rigid plastic container, or a rigid plastic container. According to another embodiment the plastic substrate comprises a polyethylene, a polypropylene, a polyester, a polyvinylchloride, a poly(tetrafluoro ethylene), a polyalkylene terephthalate, a polyalkylene furandicarboxylate, a polycarbonate, a polystyrene, a melamine formaldehyde, a polylactic acid, a plastarch material, a polyhydroxyalkanoate, a polybutylene succinate, a polycaprolactone, a polyanhydride, a polyvinyl alcohol, a cellophane, a cellulose ester, a silicone, or a mixture thereof, preferably the plastic substrate comprises polyethylene and/or polypropylene.

According to one embodiment the glass transition temperature $T_g$ of the copolymer is from 0 to 60° C., preferably from 10 to 40° C., more preferably from 15 to 30° C., and most preferably from 20 to 25° C. According to another embodiment the barrier layer comprises the copolymer in an amount from 40 to 99.9 wt.-%, preferably from 60 to 95 wt.-%, more preferably from 70 to 90 wt.-%, and most preferably from 75 to 85 wt.-%, based on the total weight of the barrier layer.

According to one embodiment the copolymer is obtainable by emulsion polymerization of (i) one or more principal monomers selected from the group consisting of $C_1$-$C_4$ alkyl (meth)acrylates, (ii) 0.1 to 5 wt.-% of one or more acid monomers, based on the total weight of all monomers, (iii) 0 to 20 wt.-% of acrylonitrile, based on the total weight of all monomers, and (iv) 0 to 10 wt.-% of further monomers other than the monomers (i) to (iii), based on the total weight of all monomers. According to another embodiment the one or more principal monomers (i) are selected from the group consisting of methyl acrylate, methyl methacrylate, ethyl acrylate, n-butyl acrylate, and mixtures thereof, and/or the one or more acid monomers (ii) are selected from acrylic acid, methacrylic acid, itaconic acid, maleic acid, fumaric acid, and mixtures thereof, and/or, the further monomers (iv) are selected from the group consisting of $C_5$-$C_{20}$ alkyl (meth)acrylates, vinyl esters of carboxylic acids comprising up to 20 carbon atoms, vinylaromatics having up to 20 carbon atoms, ethylenically unsaturated nitriles other than acrylonitrile, vinyl halides, vinyl ethers of alcohols comprising 1 to 10 carbon atoms, aliphatic hydrocarbons having 2 to 8 carbon atoms and one or two double bonds, and mixtures thereof.

According to one embodiment the surface-reacted calcium carbonate has a specific surface area of from 20 $m^2/g$ to 200 m²/g, preferably from 25 m²/g to 180 m²/g, more preferably from 30 m²/g to 140 m²/g, even more preferably from 35 m²/g to 100 m²/g, and most preferably from 40 m²/g to 50 m²/g, measured using nitrogen and the BET method according to ISO 9277. According to another embodiment the surface-reacted calcium carbonate is in form of particles having a volume median particle size $d_{50}$ from 0.1 to 50 μm, preferably from 0.5 to 25 μm, more preferably 1 to 20 μm, even more preferably from 1.1 to 10 μm, and most preferably from 1.2 to 5 μm. According to still another embodiment the mineral material is natural ground calcium carbonate.

According to one embodiment the mineral material is in form of particles having a weight median particle size $d_{50}$ from 0.01 to 15 μm, preferably from 0.1 to 10 μm, more preferably 0.3 to 5 μm, even more preferably from 0.5 to 4 μm, and most preferably from 0.7 to 2 μm. According to another embodiment the barrier layer comprises the combination of the surface-reacted calcium carbonate and the mineral material in an amount of from 0.1 to 60 wt.-%, preferably from 5 to 40 wt.-%, more preferably from 10 to 30 wt.-%, and most preferably from 15 to 25 wt.-%, based on the total weight of the barrier layer. According to still another embodiment the weight ratio of the surface-reacted calcium carbonate to the mineral material is from 1:10 to 1:1, preferably from 1:8 to 1:2, more preferably from 1:7 to 1:3, even more preferably from 1:6 to 1:3, and most preferably 1:4.

According to one embodiment the barrier layer has a layer weight of least 2 g/m², preferably at least 2.5 g/m², more preferably at least 3 g/m², and most preferably at least 4 g/m². According to another embodiment the hydrophobic substances comprise mineral oils, plasticizers, hydrophobic contaminants, bisphenol A (BPA), bis (2-ethylhexyl) phthalate (DEHP), nonylphenol monoethoxylate (NMP), nonylphenol diethoxilate (NDP), diisopropylnaphthalene, or mixtures thereof, preferably the hydrophobic substances are selected from the group consisting of mineral oil saturated hydrocarbons (MOSH), polyolefine oil saturated hydrocarbons (POSH), mineral aromatic hydrocarbons (MOAH), alkanes, naphthenes, bisphenol A (BPA), bis (2-ethylhexyl) phthalate (DEHP), nonylphenol monoethoxylate (NMP), nonylphenol diethoxilate (NDP), diisopropylnaphthalene, or mixtures thereof.

According to one embodiment the packaging material is a food packaging, a medical device packaging, or a pharmaceutical packaging, preferably a flexible packaging, a pallet, a shrink wrap, a plastic wrap, an overwrap, a freezer bag, a vacuum bag, a fast food wrapper, a food bag, a snack bag, a grocery bag, an ovenable food container, a cup, a tray, a box, a folding box, a clamp, a can, a bottle, a liquid container, a beverage container, a rigid medical thermoform, a protective medical packaging, a pouch, a bag, a tray, a lid, a blister pack, a skin pack, or an insert.

According to one embodiment in step C) the liquid barrier layer composition is applied using a spray technique and/or a printing technique, preferably selected from spray coating, screen printing, flexographic printing, inkjet printing, offset printing, rotogravure printing, tampon printing, and combinations thereof, and most preferably is applied using spray coating and/or flexographic printing. According to another embodiment step C) is carried out at a surface temperature of the plastic substrate from 10 to 100° C., and preferably from 20 to 80° C. According to still another embodiment the liquid barrier layer composition of step B) is an aqueous liquid barrier layer composition.

It should be understood that for the purpose of the present invention, the following terms have the following meaning:

For the purpose of the present invention, the term "barrier layer" refers to one or more coatings, coverings, films, skins etc., formed, created, prepared, etc., from a liquid barrier layer composition which remains predominantly on the surface of the plastic substrate. According to the present invention, the barrier layer can reduce or prevent the migration of hydrophobic substances such as mineral oils, plasticizers and/or hydrophobic contaminants, for example, from a substrate or a packaging material which is covered by the barrier layer.

The term "basis weight" as used in the present invention is determined according to DIN EN ISO 536:1996, and is defined as the weight in g/m².

For the purpose of the present invention, the "thickness" and "layer weight" of a layer refers to the thickness and layer weight, respectively, of the layer after the applied coating composition has been dried.

The "glass transition temperature ($T_g$)" is a well-known parameter to those skilled in the art, and is the temperature range, where a thermosetting polymer changes from a more pliable, compliant or "rubbery" state to a hard, rigid or "glassy" state upon cooling. The $T_g$ is usually measured using Differential Scanning calorimetry (DSC): ASTM E1356, "Standard Test Method for Assignment of the Glass Transition Temperature by Differential Scanning calorimetry". The $T_g$ is actually a temperature range, rather than a specific temperature. The convention, however, is to report a single temperature defined as the midpoint of the temperature range, bounded by the tangents to the two flat regions of the heat flow curve.

"Natural ground calcium carbonate" (GCC) in the meaning of the present invention is a calcium carbonate obtained from natural sources, such as limestone, marble, or chalk, and processed through a wet and/or dry treatment such as grinding, screening and/or fractionating, for example, by a cyclone or classifier.

"Precipitated calcium carbonate" (PCC) in the meaning of the present invention is a synthesised material, obtained by precipitation following reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP 2 447 213 A1, EP 2 524 898 A1, EP 2 371 766 A1, EP 1 712 597 A1, EP 1 712 523 A1, or WO 2013/142473 A1.

The term "surface-reacted" in the meaning of the present application shall be used to indicate that a material has been subjected to a process comprising partial dissolution of said material upon acidic treatment (e.g., by use of water-soluble free acids and/or acidic salts) in aqueous environment followed by a crystallization process which may occur in the absence or presence of further crystallization additives. The term "acid" as used herein refers to an acid in the meaning of the definition by Brønsted and Lowry (e.g., $H_2SO_4$, $HSO_4^-$), wherein the term "free acid" refers only to those acids being in the fully protonated form (e.g., $H_2SO_4$).

The "particle size" of particulate materials other than surface-reacted calcium carbonate herein is described by its distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all particles are smaller than this particle size. For the purpose of the present invention, the particle size is specified as weight median particle size $d_{50}$(wt.) unless indicated otherwise. Particle sizes were determined by using a Sedigraph™ 5100 instrument or Sedigraph™ 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$.

The "particle size" of surface-reacted calcium carbonate herein is described as volume-based particle size distribution. Volume median particle size $d_{50}$(vol.) was evaluated using a Malvern Mastersizer 2000 Laser Diffraction System. The $d_{50}$ or $d_{98}$ value, measured using a Malvern Mastersizer 2000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The term "particulate" in the meaning of the present application refers to materials composed of a plurality of particles. Said plurality of particles may be defined, for example, by its particle size distribution. The expression "particulate material" may comprise granules, powders, grains, tablets, or crumbles.

The "specific surface area" (expressed in $m^2/g$) of a material as used throughout the present document can be determined by the Brunauer Emmett Teller (BET) method with nitrogen as adsorbing gas and by use of a ASAP 2460 instrument from Micromeritics. The method is well known to the skilled person and defined in ISO 9277:2010. Samples are conditioned at 100° C. under vacuum for a period of 30 min prior to measurement. The total surface area (in $m^2$) of said material can be obtained by multiplication of the specific surface area (in $m^2/g$) and the mass (in g) of the material.

In the context of the present invention, the term "pore" is to be understood as describing the space that is found between and/or within particles, i.e. that is formed by the particles as they pack together under nearest neighbour contact (interparticle pores), such as in a powder or a compact and/or the void space within porous particles (intraparticle pores), and that allows the passage of liquids under pressure when saturated by the liquid and/or supports absorption of surface wetting liquids.

For the purpose of the present invention, the "solids content" of a liquid composition is a measure of the amount of material remaining after all the solvent or water has been evaporated. If necessary, the "solids content" of a suspension given in wt.-% in the meaning of the present invention can be determined using a Moisture Analyzer HR73 from Mettler-Toledo (T=120° C., automatic switch off 3, standard drying) with a sample size of 5 to 20 g.

Unless specified otherwise, the term "drying" refers to a process according to which at least a portion of water is removed from a material to be dried such that a constant weight of the obtained "dried" material at 120° C. is reached. Moreover, a "dried" or "dry" material may be defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

For the purpose of the present invention, the term "viscosity" or "Brookfield viscosity" refers to Brookfield viscosity. The Brookfield viscosity is for this purpose measured by a Brookfield DV-II+ Pro viscometer at 25° C.±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

For the purpose of the present application, "water-insoluble" materials are defined as those which, when mixed with 100 ml of deionised water and filtered at 20° C. to recover the liquid filtrate, provide less than or equal to 0.1 g of recovered solid material following evaporation at 95 to 100° C. of 100 g of said liquid filtrate. "Water-soluble" materials are defined as materials leading to the recovery of greater than 0.1 g of solid material following evaporation at 95 to 100° C. of 100 g of said liquid filtrate. In order to assess whether a material is an insoluble or soluble material in the meaning of the present invention, the sample size is greater than 0.1 g, preferably 0.5 g or more.

A "suspension" or "slurry" in the meaning of the present invention comprises undissolved solids and water, and optionally further additives, and usually contains large amounts of solids and, thus, is more viscous and can be of higher density than the liquid from which it is formed.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

The inventive packaging material comprises a plastic substrate comprising at least one surface, and a barrier layer for hydrophobic substances, wherein the barrier layer is in contact with the at least one surface of the plastic substrate. The barrier layer comprises (I) a copolymer, wherein the glass transition temperature $T_g$ of the copolymer is from −10 to 70° C., (II) a surface-reacted calcium carbonate, and (III) a mineral material selected from natural ground calcium carbonate and/or precipitated calcium carbonate, wherein the weight ratio of the surface-reacted calcium carbonate to the mineral material is from 1:10 to 1:0.01. The copolymer is obtainable by emulsion polymerization of (i) one or more principal monomers selected from the group consisting of $C_1$-$C_4$ alkyl (meth)acrylates, and (ii) 0.1 to 5 wt.-% of one or more acid monomers, wherein the emulsion polymerization is carried out in an aqueous medium in the presence of at least one carbohydrate compound. The surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

In the following preferred embodiments of the inventive packaging material will be set out in more detail. It is to be understood that these embodiments and details also apply to the inventive method and uses.

Plastic Substrate

The packaging material of the present invention comprises a plastic substrate.

The substrate serves as a support for the barrier layer and may be opaque, translucent, or transparent. According the present invention, the substrate is a "plastic" substrate. In the meaning of the present invention, the term "plastic" refers to a synthetic material from synthetic or semi-synthetic organic polymers, which is malleable and can be molded in solid objects.

According to one embodiment the plastic substrate comprises a polyethylene, a polypropylene, a polyester, a polyvinylchloride, a poly(tetrafluoro ethylene), a polyalkylene terephthalate, a polyalkylene furandicarboxylate, a polycarbonate, a polystyrene, a melamine formaldehyde, a polylactic acid, a plastarch material, a polyhydroxyalkanoate, a polybutylene succinate, a polycaprolactone, a polyanhydride, a polyvinyl alcohol, a cellophane, a cellulose ester, a silicone, or a mixture thereof. According to a preferred embodiment, the plastic substrate comprises polyethylene and/or polypropylene. The plastic substrate may be filled by a mineral filler, an organic pigment, an inorganic pigment, or mixtures thereof.

The plastic substrate may consist of only one layer of the above-mentioned materials or may comprise a layer structure having several sublayers of the same material or different materials. According to one embodiment, the substrate is structured by one layer. According to another embodiment the substrate is structured by at least two sublayers, preferably three, five, or seven sublayers, wherein the sublayers can have a flat or non-flat structure, e.g. a corrugated structure.

The plastic substrate may have a flat, more two-dimensional shape or can be a three-dimensional object such as, for example, a container, box, or bottle. According to one embodiment the plastic substrate is a plastic film, a plastic sheet, a plastic foil, a semi-rigid plastic container, or a rigid plastic container.

Furthermore, the plastic substrate can be laminated onto another material, for example, a paper, cardboard, containerboard, and/or metal foil. According to one embodiment, the plastic substrate comprises at least one layer of paper, cardboard, containerboard and/or a metal foil, and a plastic surface layer. Cardboard may comprise carton board or boxboard, corrugated cardboard, or non-packaging cardboard such as chromoboard, or drawing cardboard. Containerboard may encompass linerboard and/or a corrugating medium. Both linerboard and a corrugating medium are used to produce corrugated board. The paper, cardboard, or containerboard substrate can have a basis weight from 10 to 1000 g/m$^2$, from 20 to 800 g/m$^2$, from 30 to 700 g/m$^2$, or from 50 to 600 g/m$^2$.

In addition or alternatively, the plastic substrate may comprise a coating on the surface of the substrate, which is not in contact with the barrier layer. For example, the plastic substrate may comprise a heat seal layer.

The plastic substrate may have a thickness of at least 10 µm, e.g. at least 1 mm, 5 mm, or 1 cm.

According to one embodiment, the at least one surface of the plastic substrate is pre-treated, preferably by corona treatment, atmospheric-pressure plasma treatment, flame plasma treatment, and/or chemical plasma treatment. Said pre-treatment methods are well-known to the skilled person and may result in an increased surface tension of the plastic substrate surface. According to one embodiment, the surface tension of the plastic substrate is between 35 and 50 mN/m, preferably between 38 and 45 mN/m, and more preferably between 38 and 40 mN/m.

Copolymer

The barrier layer of the inventive packaging material comprises (I) a copolymer obtainable by emulsion polymerization of (i) one or more principal monomers selected from the group consisting of $C_1$-$C_4$ alkyl (meth)acrylates, and (ii) 0.1 to 5 wt.-% of one or more acid monomers, based on the total weight of all monomers, wherein the glass transition temperature $T_g$ of the copolymer is from −10 to 70° C., and the emulsion polymerization is carried out in an aqueous medium in the presence of at least one carbohydrate compound.

According to one embodiment the glass transition temperature $T_g$ of the copolymer is from 0 to 60° C., preferably from 10 to 40° C., more preferably from 15 to 30° C., and most preferably from 20 to 25° C. The glass transition temperature $T_g$ is an important characteristic of polymers not only for their identification but it is also the deciding factor for their useful upper limit of service temperature, the compatibility of two polymers in a blend, and their processing temperature. The copolymer according to the present invention has a $T_g$ value from −10 to 70° C., which may facilitate the application of the barrier layer, and may provide the possibility to apply the barrier layer even at lower processing temperatures. Thus, an extra heat-up of the plastic substrate can be avoided or at least reduced, which in turn may reduce energy costs, and may lead to a more sustainable production of the packaging materials.

According to one embodiment, the copolymer is obtainable by emulsion polymerization of
(i) one or more principal monomers selected from the group consisting of $C_1$-$C_4$ alkyl (meth)acrylates,
(ii) 0.1 to 5 wt.-% of one or more acid monomers, based on the total weight of all monomers,
(iii) 0 to 20 wt.-% of acrylonitrile, based on the total weight of all monomers, and
(iv) 0 to 10 wt.-% of further monomers other than the monomers (i) to (iii), based on the total weight of all monomers.

The one or more principal monomers (i) may be present in an amount of at least 70 wt.-%, preferably at least 75 wt.-%, and more preferably from 79.5 to 99.5 wt.-%, based on the total weight of all monomers. According to one embodiment, the one or more principal monomers (i) are selected from the group consisting of methyl acrylate, methyl methacrylate, ethyl acrylate, n-butyl acrylate, and mixtures thereof.

Acid monomers are ethylenically unsaturated free-radically polymerizable monomers with at least one acid group, for example, monomers with carboxylic acid, sulfonic acid or phosphonic acid groups. Carboxylic acid groups are preferred. Examples of suitable acid monomers are acrylic acid, methacrylic acid, itaconic acid, maleic acid, fumaric acid, and mixtures thereof. According to one embodiment the one or more acid monomers (ii) are preferably selected from acrylic acid and/or methacrylic acid. The one or more acid monomers (ii) may be preferably present in an amount from 0.5 to 5 wt.-%, based on the total weight of all monomers.

Optionally, the copolymer may be formed from acrylonitrile as further monomer (iii). According to one embodiment, the acrylonitrile is present in an amount from 1 to 20 wt.-%, preferably from 2 to 20 wt.-%, based on the total weight of all monomers.

The copolymer can optionally be formed of further monomers (iv) other than the monomers (i) to (iii). According to one embodiment, the further monomers (iv) are present in an amount from 0.1 to 10 wt.-%, preferably from 0.1 to 5 wt.-%, based on the total weight of all monomers. The further monomers (iv) may be selected from the group consisting of $C_5$-$C_{20}$ alkyl (meth)acrylates, vinyl esters of carboxylic acids comprising up to 20 carbon atoms, vinylaromatics having up to 20 carbon atoms, ethylenically unsaturated nitriles other than acrylonitrile, vinyl halides, vinyl ethers of alcohols comprising 1 to 10 carbon atoms, aliphatic hydrocarbons having 2 to 8 carbon atoms and one or two double bonds, and mixtures thereof.

The emulsion polymerization is carried out in the presence of at least one carbohydrate compound. The carbohydrate compound may be selected from oligosaccharides (constructed of 2 to 10 saccharide units) and polysaccharides (constructed of more than 10 saccharide units), preferably from degraded polysaccharides, and more preferably degraded starch, degraded hemicelluloses or degraded chitosan. Maltodextrin and glucose syrup are particularly preferred. According to one embodiment, the emulsion polymerization utilizes from 10 to 200 parts by weight, preferably from 20 to 150 parts by weight, and more preferably from 30 to 150 parts by weight of carbohydrate compound per 100 parts by weight of monomers to be polymerized.

Suitable copolymers as well as methods and equipment for carrying out an emulsion polymerization are known to the skilled person, and are described, for example, in WO 2013/083504 A1.

Commercially available copolymers which may be advantageously used in the present invention may be those of the Cartaseal® series available from Clariant, e.g. Cartaseal® TXU liq. (acrylic polymer), Cartaseal® SVU liq. (ethylene—acrylic acid copolymer), Cartaseal VWF-DP (styrene—acrylic copolymer), Cartaseal SW-DP (ethylene—acrylic acid copolymer); Acronal® LR 9014 available from BASF SE (dispersion of acrylic acid ester and methacrylic acid ester polymers), Ultraseal W-952 available from Keim additec surface GmbH, 55481 Kirchberg, Germany (mixture of a washing compound and a styrene—butadiene copolymer), Ultraseal W-953 available from Keim additec surface GmbH, 55481 Kirchberg, Germany (mixture of a paraffin wax and a styrene—butadiene copolymer), Tecseal E787/50 available from Trüb Emulsions Chemie (ethylene—acrylic—copolymer dispersion), the EPOTAL® series available from BASF SE, e.g. EPOTAL® SP-101D.

According to a preferred embodiment, the copolymer is obtainable by emulsion polymerization of
  (i) 95 to 99 wt.-%, based on the total weight of all monomers, of one or more principal monomers selected from the group consisting of $C_1$-$C_4$ alkyl (meth)acrylates, preferably ethyl acrylate and/or methyl methacrylate, and
  (ii) 0.1 to 5 wt.-%, based on the total weight of all monomers, of one or more acid monomers, preferably acrylic acid,
  wherein the glass transition temperature $T_g$ of the copolymer is from −10 to 70° C., and the emulsion polymerization is carried out in an aqueous medium in the presence of at least one carbohydrate compound, preferably maltodextrin.

According to the present invention, the copolymer may be used in the form of a powder, an aqueous solution, an aqueous suspensions, or an aqueous emulsions, and may optionally contain further additives. The copolymer of the present invention may consist of at least one of the copolymer defined above. It may, however, also comprise mixtures of the above defined and other polymers, as well as conventional additives such as additives selected from the group comprising thickeners, plasticizers, stabilizers, lubricants, biocides, dispersants, milling aids, rheology modifiers, defoamers, optical brighteners, dyes, pH controlling agents and mixtures thereof.

According to one embodiment the barrier layer comprises the copolymer in an amount from 40 to 99.9 wt.-%, preferably from 60 to 95 wt.-%, more preferably from 70 to 90 wt.-%, and most preferably from 75 to 85 wt.-%, based on the total weight of the barrier layer.

Surface-Reacted Calcium Carbonate

In addition to the copolymer, the barrier layer of the inventive packaging material comprises a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

An $H_3O^+$ ion donor in the context of the present invention is a Brønsted acid and/or an acid salt, i.e. a salt containing an acidic hydrogen.

In a preferred embodiment of the invention the surface-reacted calcium carbonate is obtained by a process comprising the steps of: (a) providing a suspension of natural or precipitated calcium carbonate, (b) adding at least one acid having a $pK_a$ value of 0 or less at 20° C. or having a $pK_a$ value from 0 to 2.5 at 20° C. to the suspension of step a), and (c) treating the suspension of step (a) with carbon dioxide before, during or after step (b). According to another embodiment the surface-reacted calcium carbonate is obtained by a process comprising the steps of: (A) providing a natural or precipitated calcium carbonate, (B) providing at least one water-soluble acid, (C) providing gaseous $CO_2$, (D) contacting said natural or precipitated calcium carbonate of step (A) with the at least one acid of step (B) and with the $CO_2$ of step (C), characterised in that: (i) the at least one acid of step B) has a $pK_a$ of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a $pK_a$ of greater than 7 at 20° C., associated with the ionisation of the first available hydrogen, and the salt anion of which is capable of forming water-insoluble calcium salts, is additionally provided.

"Natural ground calcium carbonate" (GCC) preferably is selected from calcium carbonate containing minerals selected from the group comprising marble, chalk, limestone and mixtures thereof. Natural ground calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-dumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example $CaCl_2$) and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one $H_3O^+$ ion donor by the same means as used for grinding natural calcium carbonate as described above.

According to one embodiment of the present invention, the natural ground calcium carbonate or precipitated calcium carbonate is in form of particles having a weight median particle size $d_{50}$ of 0.05 to 10.0 µm, preferably 0.2 to 5.0 µm, more preferably 0.4 to 3.0 µm, most preferably 0.5 to 1.2 µm, especially 0.6 µm. According to a further embodiment of the present invention, the natural ground calcium carbonate or precipitated calcium carbonate is in form of particles having a weight top cut particle size $d_{98}$ of 0.15 to 30 µm, preferably 0.6 to 15 µm, more preferably 1.2 to 10 µm, most preferably 1.5 to 4 µm, especially 1.6 µm.

The natural ground calcium carbonate and/or precipitated calcium carbonate may be used dry or suspended in water. Preferably, a corresponding slurry has a content of natural ground calcium carbonate or precipitated calcium carbonate within the range of 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

The one or more $H_3O^+$ ion donor used for the preparation of surface-reacted calcium carbonate may be any strong acid, medium-strong acid, or weak acid, or mixtures thereof, generating $H_3O^+$ ions under the preparation conditions. According to the present invention, the at least one $H_3O^+$ ion donor can also be an acid salt, generating $H_3O^+$ ions under the preparation conditions.

According to one embodiment, the at least one $H_3O^+$ ion donor is a strong acid having a $pK_a$ of 0 or less at 20° C.

According to another embodiment, the at least one $H_3O^+$ ion donor is a medium-strong acid having a $pK_a$ value from 0 to 2.5 at 20° C. If the $pK_a$ at 20° C. is 0 or less, the acid is preferably selected from sulphuric acid, hydrochloric acid, or mixtures thereof. If the $pK_a$ at 20° C. is from 0 to 2.5, the $H_3O^+$ ion donor is preferably selected from $H_2SO_3$, $H_3PO_4$, oxalic acid, or mixtures thereof. The at least one $H_3O^+$ ion donor can also be an acid salt, for example, $HSO_4^-$ or $H_2PO_4^-$, being at least partially neutralized by a corresponding cation such as $Li^+$, $Na^+$ or $K^+$, or $HPO_4^{2-}$, being at least partially neutralised by a corresponding cation such as $Li^+$, $Na^+$, $K^+$, $Mg^{2+}$ or $Ca^{2+}$. The at least one $H_3O^+$ ion donor can also be a mixture of one or more acids and one or more acid salts.

According to still another embodiment, the at least one $H_3O^+$ ion donor is a weak acid having a $pK_a$ value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided. According to the preferred embodiment, the weak acid has a $pK_a$ value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one $H_3O^+$ ion donor is selected from the group consisting of hydrochloric acid, sulphuric acid, sulphurous acid, phosphoric acid, citric acid, oxalic acid, acetic acid, formic acid, and mixtures thereof. Preferably the at least one $H_3O^+$ ion donor is selected from the group consisting of hydrochloric acid, sulphuric acid, sulphurous acid, phosphoric acid, oxalic acid, $H_2PO_4^-$, being at least partially neutralised by a corresponding cation such as $Li^+$, $Na^+$ or $K^+$, $HPO_4^{2-}$, being at least partially neutralised by a corresponding cation such as $Li^+$, $Na^{+}$ $K^+$, $Mg^{2+}$, or $Ca^{2+}$ and mixtures thereof, more preferably the at least one acid is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

The one or more $H_3O^+$ ion donor can be added to the suspension as a concentrated solution or a more diluted solution. Preferably, the molar ratio of the $H_3O^+$ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the $H_3O^+$ ion donor to the water before the natural or precipitated calcium carbonate is suspended.

In a next step, the natural ground calcium carbonate or precipitated calcium carbonate is treated with carbon dioxide. If a strong acid such as sulphuric acid or hydrochloric acid is used for the $H_3O^+$ ion donor treatment of the natural ground calcium carbonate or precipitated calcium carbonate, the carbon dioxide is automatically formed. Alternatively or additionally, the carbon dioxide can be supplied from an external source.

$H_3O^+$ ion donor treatment and treatment with carbon dioxide can be carried out simultaneously which is the case when a strong or medium-strong acid is used. It is also possible to carry out $H_3O^+$ ion donor treatment first, e.g. with a medium strong acid having a $pK_a$ in the range of 0 to 2.5 at 20° C., wherein carbon dioxide is formed in situ, and thus, the carbon dioxide treatment will automatically be carried out simultaneously with the $H_3O^+$ ion donor treatment, followed by the additional treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the $H_3O^+$ ion donor treatment step and/or the carbon dioxide treatment step are repeated at least once, more preferably several times. According to one embodiment, the at least one $H_3O^+$ ion donor is added over a time period of at least about 5 min, preferably at least about 10 min, typically from about 10 to about 20 min, more preferably about 30 min, even more preferably about 45 min, and sometimes about 1 h or more.

Subsequent to the $H_3O^+$ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or precipitated calcium carbonate as an aqueous suspension having a pH of greater than 6.0, preferably greater than 6.5, more preferably greater than 7.0, even more preferably greater than 7.5.

Further details about the preparation of the surface-reacted natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Similarly, surface-reacted precipitated calcium carbonate is obtained. As can be taken in detail from WO 2009/074492 A1, surface-reacted precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted natural ground calcium carbonate or precipitated calcium carbonate, the natural ground calcium carbonate or precipitated calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural ground calcium carbonate or precipitated calcium carbonate before adding the acid and/or carbon dioxide.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with an acid and carbon dioxide has already started. Further details about the preparation of the surface-reacted natural or precipitated calcium carbonate in the presence of at least one silicate and/or silica and/or aluminium hydroxide and/or earth alkali aluminate component(s) are disclosed in WO 2004/083316 A1, the content of this reference herewith being included in the present application.

The surface-reacted calcium carbonate can be kept in suspension, optionally further stabilised by a dispersant. Conventional dispersants known to the skilled person can be used. A preferred dispersant is comprised of polyacrylic acids and/or carboxymethylcelluloses.

Alternatively, the aqueous suspension described above can be dried, thereby obtaining the solid (i.e. dry or containing as little water that it is not in a fluid form) surface-reacted natural ground calcium carbonate or precipitated calcium carbonate in the form of granules or a powder.

The surface-reacted calcium carbonate may have different particle shapes, such as e.g. the shape of roses, golf balls and/or brains.

According to one embodiment the surface-reacted calcium carbonate has a specific surface area of from 20 m$^2$/g to 200 m$^2$/g, preferably from 25 m$^2$/g to 180 m$^2$/g, more preferably from 30 m$^2$/g to 140 m$^2$/g, even more preferably from 35 m$^2$/g to 100 m$^2$/g, and most preferably from 40 m$^2$/g to 50 m$^2$/g, measured using nitrogen and the BET method. The BET specific surface area in the meaning of the present invention is defined as the surface area of the particles divided by the mass of the particles. As used therein the specific surface area is measured by adsorption using the BET isotherm (ISO 9277:1995) and is specified in m$^2$/g.

According to one embodiment the surface-reacted calcium carbonate has a volume median particle size $d_{50}$ from 0.1 to 50 µm, preferably from 0.5 to 25 µm, more preferably from 1 to 20 µm, even more preferably from 1.1 to 10 µm, and most preferably from 1.2 to 5 µm.

It may furthermore be preferred that the surface-reacted calcium carbonate particles have a volume top cut particle size $d_{98}$ of from 2 to 150 µm, preferably from 3 to 80 µm, more preferably 4 to 50 µm, and most preferably from 5 to 10 µm.

The value $d_x$ represents the diameter relative to which x % of the particles have diameters less than $d_x$. This means that the $d_{98}$ value is the particle size at which 98% of all particles are smaller. The $d_{98}$ value is also designated as "top cut". The $d_x$ values may be given in volume or weight percent. The $d_{50}$(wt) value is thus the weight median particle size, i.e. 50 wt.-% of all grains are smaller than this particle size, and the $d_{50}$(vol) value is the volume median particle size, i.e. 50 vol. % of all grains are smaller than this particle size.

Volume median grain diameter $d_{50}$ was evaluated using a Malvern Mastersizer 2000 Laser Diffraction System. The $d_{50}$ or $d_{98}$ value, measured using a Malvern Mastersizer 2000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The weight median grain diameter is determined by the sedimentation method, which is an analysis of sedimentation behaviour in a gravimetric field. The measurement is made with a Sedigraph™ 5100 or 5120, Micromeritics Instrument Corporation. The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and sonicated.

The processes and instruments are known to the skilled person and are commonly used to determine grain size of fillers and pigments.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 µm (~nm). The equilibration time used at each pressure step is 20 seconds. The sample material is sealed in a 5 cm$^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p. 1753-1764).

The total pore volume seen in the cumulative intrusion data can be separated into two regions with the intrusion data from 214 µm down to about 1-4 µm showing the coarse packing of the sample between any agglomerate structures contributing strongly. Below these diameters lies the fine interparticle packing of the particles themselves. If they also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Preferably, the surface-reacted calcium carbonate has an intra-particle intruded specific pore volume in the range from 0.1 to 2.3 cm$^3$/g, more preferably from 0.15 to 2.0 cm$^3$/g, and most preferably from 0.18 to 1.8 cm$^3$/g, calculated from mercury porosimetry measurement.

According to an exemplary embodiment, the surface-reacted calcium carbonate has a volume median particle size $d_{50}$ from 1.1 to 10 µm, preferably from 1.2 to 5 µm, a specific surface-area of from 30 to 140 m$^2$/g, preferably from 40 to 60 m$^2$/g, measured using nitrogen and the BET method, and an intra-particle intruded specific pore volume from 0.1 to 2.0 cm$^3$/g, preferably from 0.15 to 0.4 cm$^3$/g, calculated from mercury porosimetry measurement.

Due to the intra and interpore structure of the surface-reacted calcium carbonate, it can be a superior agent to deliver previously ad/absorbed materials over time relative to common materials having similar specific surface areas. Thus, generally, any agent fitting into the intra- and/or inter particle pores of the surface-reacted calcium carbonate is suitable to be transported by the surface-reacted calcium carbonate according to the invention. For example, active agents such as those selected from the group comprising pharmaceutically active agents, biologically active agents, disinfecting agents, preservatives, flavouring agents, surfactants, oils, fragrances, essential oils, and mixtures thereof can be used. According to one embodiment, at least one active agent is associated with the surface-reacted calcium carbonate.

According to one embodiment of the present invention, the surface-reacted calcium carbonate comprises an water-insoluble, at least partially crystalline calcium salt of an anion of the at least one acid, which is formed on the surface of the natural ground calcium carbonate or precipitated calcium carbonate. According to one embodiment, the water-insoluble, at least partially crystalline salt of an anion of the at least one acid covers the surface of the natural ground calcium carbonate or precipitated calcium carbonate at least partially, preferably completely. Depending on the employed at least one acid, the anion may be sulphate, sulphite, phosphate, citrate, oxalate, acetate, formiate and/or chloride.

For example, the use of phosphoric acid, $H_2PO_4^-$ or $HPO_4^{2-}$ as the $H_3O^+$ ion donor may lead to the formation of hydroxylapatite. Therefore, in a preferred embodiment, the at least one water-insoluble calcium salt is hydroxylapatite.

According to one embodiment, the at least one water-insoluble calcium salt is hydroxylapatite, wherein the surface-reacted calcium carbonate provides a ratio of hydroxylapatite to calcite, aragonite and/or vaterite, preferably to calcite, in the range of from 1:99 to 99:1 by weight. Preferably, the surface-reacted calcium carbonate may provide a ratio of hydroxylapatite to calcite, aragonite and/or vaterite, preferably to calcite, in the range of from 1:9 to 9:1, preferably 1:7 to 8:1, more preferably 1:5 to 7:1 and most preferably 1:4 to 7:1 by weight.

In a similar manner, the use of other $H_3O^+$ ion donors may lead to the formation of corresponding water-insoluble calcium salts other than calcium carbonate on at least part of the surface of the surface-reacted calcium carbonate. In one embodiment, the at least one water-insoluble calcium salt is thus selected from the group consisting of octacalcium phosphate, hydroxylapatite, chlorapatite, fluorapatite, carbonate apatite and mixtures thereof, wherein the surface-reacted calcium carbonate shows a ratio of the at least one water-insoluble calcium salt to calcite, aragonite and/or vaterite, preferably to calcite, in the range of from 1:99 to 99:1, preferably from 1:9 to 9:1, more preferably from 1:7 to 8:1, even more preferably from 1:5 to 7:1 and most preferably from 1:4 to 7:1 by weight.

According to one embodiment the surface-reacted calcium carbonate comprises:
(i) a specific surface area of from 20 to 200 m²/g measured using nitrogen and the BET method according to ISO 9277:2010, and
(ii) an intra-particle intruded specific pore volume in the range of from 0.1 to 2.3 cm³/g calculated from mercury porosimetry measurement.

Mineral Material

In addition to the copolymer and the surface-reacted calcium carbonate, the barrier layer of the inventive packaging material comprises a mineral material selected from natural ground calcium carbonate and/or precipitated calcium carbonate.

"Natural ground calcium carbonate" (GCC) preferably is selected from calcium carbonate containing minerals selected from the group comprising marble, chalk, limestone and mixtures thereof. Natural ground calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-dumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

According to a preferred embodiment the mineral material is natural ground calcium carbonate.

According to one embodiment the mineral material is in form of particles having a weight median particle size $d_{50}$ from 0.01 to 15 µm, preferably from 0.1 to 10 µm, more preferably 0.3 to 5 µm, even more preferably from 0.5 to 4 µm, and most preferably from 0.7 to 2 µm.

Barrier Layer

In addition to the plastic substrate, the packaging material of the present invention comprises a barrier layer for hydrophobic substances, wherein the barrier layer is in contact with the at least one surface of the plastic substrate. The barrier layer comprises (I) a copolymer as defined above, (II) a surface-reacted calcium carbonate as defined above, and (III) a mineral material selected from natural ground calcium carbonate and/or precipitated calcium carbonate as defined above, wherein the weight ratio of the surface-reacted calcium carbonate to the mineral material is from 1:10 to 1:0.01.

According to one embodiment, the weight ratio of the surface-reacted calcium carbonate to the mineral material is from 1:10 to 1:1, preferably from 1:8 to 1:2, more preferably from 1:7 to 1:3, even more preferably from 1:6 to 1:3, and most preferably 1:4.

According to one embodiment the barrier layer comprises the combination of the surface-reacted calcium carbonate and the mineral material in an amount of from 0.1 to 60 wt.-%, preferably from 5 to 40 wt.-%, more preferably from 10 to 30 wt.-%, and most preferably from 15 to 25 wt.-%, based on the total weight of the barrier layer.

According to one embodiment the barrier layer comprises the surface-reacted calcium carbonate in an amount of from 0.02 to 12 wt.-%, preferably from 1 to 8 wt.-%, more preferably from 2 to 6 wt.-%, and most preferably from 3 to 5 wt.-%, based on the total weight of the barrier layer.

According to one embodiment the barrier layer comprises the mineral material in an amount of from 0.08 to 48 wt.-%, preferably from 4 to 32 wt.-%, more preferably from 8 to 24 wt.-%, and most preferably from 12 to 20 wt.-%, based on the total weight of the barrier layer.

As noted above, the barrier layer may comprise the copolymer in an amount from 40 to 99.9 wt.-%, preferably from 60 to 95 wt.-%, more preferably from 70 to 90 wt.-%, and most preferably from 75 to 85 wt.-%, based on the total weight of the barrier layer. According to one embodiment, the weight ratio of the combination of surface-reacted calcium carbonate and the mineral material to the copolymer of the present invention is from 1:1 to 1:10, preferably from 1:2 to 1:8, more preferably from 1:3 to 1:6, and most preferably 1:4.

According to one embodiment, the barrier layer comprises additional mineral pigments and/or fillers, preferably selected from the group consisting of dolomite, talc, bentonite, clay, magnesite, satin white, sepiolite, huntite, diatomite, silicates, titanium dioxide, and mixtures thereof. These additional mineral pigments and/or fillers may be in form of particles having a weight median particle size $d_{50}$ from 0.01 to 15 µm, preferably from 0.1 to 10 µm, more preferably 0.3 to 5 µm, even more preferably from 0.5 to 4 µm, and most preferably from 0.7 to 2 µm. The barrier layer may comprise the additional mineral pigments and/or fillers in an amount of up to 20 wt.-%, preferably from 5 to 10 wt.-%, based on total weight of the barrier layer.

According to one embodiment of the present invention, the barrier layer has a layer weight of least 2 g/m², preferably at least 2.5 g/m², more preferably at least 3 g/m², and most preferably at least 4 g/m². According to another embodiment, the barrier layer has a layer weight from 2 to 150 g/m², preferably from 2.5 to 100 g/m², more preferably from 3 to 80 g/m², and most preferably from 4 to 50 g/m².

It was surprisingly found by the inventors that the barrier layer of the present invention formed on the plastic substrate can prevent the migration of hydrophobic substances such as mineral oils, plasticizers and/or hydrophobic contaminants, which may be present in the plastic substrate or in a material adjacent to the plastic substrate, into materials being in contact with the barrier layer. Materials that may be adjacent to the plastic substrate are, for example, substrates based on paper, cardboard, containerboard, or polymeric materials, which have been laminated onto the plastic substrate, or outer paper, cardboard, containerboard, or plastic packaging materials. Moreover, it was surprisingly found by the inventors that the inventive barrier layer exhibits a reduced stickiness, and thus, a reduced blocking tendency. This is especially noteworthy because polymers having a glass transition temperature $T_g$ in a lower temperature range, for example, between −10 and 70° C., often cause problems during production, for example, during coating applications, due to tackiness and resulting strong blocking.

According to a further aspect of the present invention, use of a composition as barrier layer for a plastic substrate is provided, wherein the barrier layer prevents migration of hydrophobic substances, and wherein the barrier layer comprises (I) a copolymer obtainable by emulsion polymerization of
(i) one or more principal monomers selected from the group consisting of $C_1$-$C_4$ alkyl (meth)acrylates, and
(ii) 0.1 to 5 wt.-% of one or more acid monomers, wherein the glass transition temperature $T_g$ of the copolymer is from −10 to 70° C., and the emulsion polymerization is carried out in an aqueous medium in the presence of at least one carbohydrate compound, (II) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and (III) a mineral material selected from natural ground calcium carbonate and/or precipitated calcium carbonate, wherein the weight ratio of the surface-reacted calcium carbonate to the mineral material is from 1:10 to 1:0.01.

According to one embodiment, the barrier layer prevents migration from the plastic substrate or from materials adjacent to the plastic substrate.

The hydrophobic substances may comprise mineral oils, plasticizers, hydrophobic contaminants, bisphenol A (BPA), bis (2-ethylhexyl) phthalate (DEHP), nonylphenol monoethoxylate (NMP), nonylphenol diethoxilate (NDP), diisopropylnaphthalene, or mixtures thereof. According to one embodiment the hydrophobic substances are selected from the group consisting of mineral oil saturated hydrocarbons (MOSH), polyolefine oil saturated hydrocarbons (POSH), mineral aromatic hydrocarbons (MOAH), alkanes, naphthenes, bisphenol A (BPA), bis (2-ethylhexyl) phthalate (DEHP), nonylphenol monoethoxylate (NMP), nonylphenol diethoxilate (NDP), diisopropylnaphthalene, or mixtures thereof.

Packaging Material

According to the present invention, a packaging material is provided comprising a plastic substrate comprising at least one surface, and a barrier layer for hydrophobic substances, wherein the barrier layer is in contact with the at least one surface of the plastic substrate, and wherein the barrier layer comprises (I) a copolymer obtainable by emulsion polymerization of (i) one or more principal monomers selected from the group consisting of $C_1$-$C_4$ alkyl (meth)acrylates, and (ii) 0.1 to 5 wt.-% of one or more acid monomers, wherein the glass transition temperature $T_g$ of the copolymer is from −10 to 70° C., and the emulsion polymerization is carried out in an aqueous medium in the presence of at least one carbohydrate compound, (II) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and (III) a mineral material selected from natural ground calcium carbonate and/or precipitated calcium carbonate, wherein the weight ratio of the surface-reacted calcium carbonate to the mineral material is from 1:10 to 1:0.01.

The packaging material of the present invention may comprise more than one barrier layer on the at least one surface of the plastic substrate. For example, the packaging material of the present invention may comprise at least two, at least three or at least four barrier layers on the at least one surface of the plastic substrate. Said barrier layers may have the same composition or different compositions.

According to one embodiment of the present invention, the packaging material comprises a plastic substrate having a first side and a reverse side, and a first barrier layer and a second barrier layer, wherein the first barrier layer is in contact with the first side of the substrate and the second barrier layer is in contact with the reverse side of the substrate. According to one embodiment, the packaging material comprises at least two, at least three or at least four barrier layers on the first and/or the reverse side of the plastic substrate. Said barrier layers may have the same composition or different compositions.

According to another embodiment of the present invention, the packaging material comprises a three-dimensional plastic substrate having an inside surface and an outside surface, wherein the barrier layer is in contact with the inside surface or the outside surface. According to still another embodiment the packaging material comprises a three-dimensional plastic substrate having an inside surface and an outside surface, and a first barrier layer and a second barrier layer, wherein the first barrier layer is in contact with the inside surface and the second barrier layer is in contact with the outside surface.

Generally, the packaging material of the present invention may be employed in any kind of packaging application. However, since the packaging material of the present invention provides a migration barrier for hydrophobic substance it may be particularly useful in applications in which contamination of the packed product should be all means be prevented. According to one embodiment the packaging material of the present invention is used in food packaging applications, medical device packaging applications, or pharmaceutical packaging applications. According to one embodiment the packaging material is a food packaging, a medical device packaging, or a pharmaceutical packaging, preferably a flexible packaging, a pallet, a shrink wrap, a plastic wrap, an overwrap, a freezer bag, a vacuum bag, a fast food wrapper, a food bag, a snack bag, a grocery bag, an ovenable food container, a cup, a tray, a box, a folding box, a clamp, a can, a bottle, a liquid container, a beverage container, a rigid medical thermoform, a protective medical packaging, a pouch, a bag, a tray, a lid, a blister pack, a skin pack, or an insert.

According to a further aspect of the present invention, a method for producing a packaging material is provided, the method comprising the steps of:
A) providing a plastic substrate comprising at least one surface,
B) providing a liquid barrier layer composition,
C) applying the liquid barrier layer composition onto the at least one surface of the plastic substrate to form a barrier layer for hydrophobic substances, and
D) drying the barrier layer,
wherein the liquid barrier layer composition comprises (I) a copolymer obtainable by emulsion polymerization of
(i) one or more principal monomers selected from the group consisting of $C_1$-$C_4$ alkyl (meth)acrylates, and
(ii) 0.1 to 5 wt.-% of one or more acid monomers, wherein the glass transition temperature $T_g$ of the copolymer is from −10 to 70° C., and the emulsion polymerization is carried out in an aqueous medium in the presence of at least one carbohydrate compound,
(II) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and (III) a mineral material selected from natural ground calcium carbonate and/or precipitated calcium carbonate, wherein the weight ratio of the surface-reacted calcium carbonate to the mineral material is from 1:10 to 1:0.01.

According to one embodiment of the present invention, the liquid barrier layer composition is an aqueous composition, i.e. a composition containing water as the only solvent. According to another embodiment, the liquid barrier layer composition is a non-aqueous composition. Suitable solvents are known to the skilled person and are, for example, alcohol ethers, alcohols, aliphatic hydrocarbons, esters, and mixtures thereof, or mixtures thereof with water.

The liquid barrier layer composition provided in step B) may have a solids content from 20 to 70 wt.-%, preferably from 40 to 65 wt.-%, and most preferably from 50 to 60 wt.-%, based on the total weight of the liquid barrier layer composition. The solids content of the liquid barrier layer composition can be adjusted by the methods known to the skilled person. For example, the liquid barrier layer composition may be partially or fully dewatered by a filtration, centrifugation or thermal separation process. Alternatively, water and/or a solvent may be added to the liquid coating composition until the desired solids content is obtained.

According to one embodiment of the present invention, the liquid barrier layer composition has a Brookfield viscosity of between 10 and 4000 mPa·s at 20° C., preferably between 20 and 2000 mPa·s at 20° C., more preferably between 50 and 1000 mPa·s at 20° C., and most preferably between 80 and 500 mPa·s at 20° C.

In order to prepare the liquid barrier layer composition, any one of the components (I), (II), and (III) may, independently from each other, be provided in dry form, or in the form of suspensions, dispersions, slurries or solutions, and be mixed in any order. Thus, the surface-reacted calcium carbonate and the mineral material may be added to the copolymer in any order. It may be advantageous to first mix the surface-reacted calcium carbonate and the mineral material, and subsequently, add the obtained mixture to the copolymer. It is, however, also possible to add the surface-reacted calcium carbonate first to the copolymer, and subsequently the mineral material, or vice versa.

The mixing of the components may be carried out by any suitable mixing means known to those skilled in the art, and the skilled person will adapt the mixing conditions such as the mixing speed and temperature according to his process equipment. For example, the mixing may take place by means of a plowshare mixer. Plowshare mixers function by the principle of a fluidized bed produced mechanically. Plowshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany, or from Silverson, U.S.A. Furthermore, a tubular mixing apparatus, for example, from Ystral GmbH, Ballrechten-Dottingen, Germany may be used. Other equipment that may be used in the inventive process is a MEGATRON® Inline homogenizer from Kinematika AG, Switzerland.

To ensure a better dispersion, a dispersant may also be added to the liquid barrier layer composition, e.g., in the form of an aqueous solution and/or a powder of a dispersant. A suitable dispersant is preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The weight average molecular weight $M_w$ of such products is preferably in the range from 2000 to 15000 g/mol, with a weight average molecular weight $M_w$ from 3000 to 7000 g/mol or 3500 to 6000 g/mol being especially preferred. According to an exemplary embodiment, the dispersant is sodium polyacrylate having a weight average molecular weight $M_w$ from 2000 to 15000 g/mol, preferably from 3000 to 7000 g/mol, and most preferably from 3500 to 6000 g/mol.

Other optional additives that may be added to the liquid barrier layer compositions are, for example, dispersants, milling aids, surfactants, rheology modifiers, lubricants, defoamers, optical brighteners, dyes, preservatives, or pH controlling agents. According to one embodiment, the liquid barrier layer composition further comprises a rheology modifier. Preferably the rheology modifier is present in an amount of less than 1 wt.-%, based on the total weight of the filler.

In method step C), the liquid barrier layer composition may be applied onto the at least one surface of the plastic substrate by conventional coating means commonly used in this art. According to one embodiment, in step C) the liquid barrier layer composition is applied using a spray technique and/or a printing technique, preferably selected from spray coating, screen printing, flexographic printing, inkjet printing, offset printing, rotogravure printing, tampon printing, and combinations thereof. According to a preferred embodiment of the present invention, in step C) the liquid barrier layer composition is applied using spray coating and/or flexographic printing. Spraying techniques such as spray coating may be particularly useful for three-dimensional plastic substrates such as containers, boxes, or bottles.

According to one embodiment of the present invention, the liquid barrier layer composition is applied in an amount such that a layer weight of least 2 g/m$^2$, preferably at least 2.5 g/m$^2$, more preferably at least 3 g/m$^2$, and most preferably at least 4 g/m$^2$ is obtained. According to another embodiment, the liquid barrier layer composition is applied in an amount such that a layer weight from 2 to 150 g/m$^2$, preferably from 2.5 to 100 g/m$^2$, more preferably from 3 to 80 g/m$^2$, and most preferably from 4 to 50 g/m$^2$ is obtained.

According to one embodiment of the present invention, step C) is carried out at a surface temperature of the plastic substrate from 10 to 100° C., and preferably from 10 to 80° C.

According to step D), the barrier layer formed on the plastic substrate is dried. The drying can be carried out by any method known in the art, and the skilled person will adapt the drying conditions such as the temperature according to his process equipment. For example, the barrier layer can be dried by infrared drying and/or convection drying. The drying step may be carried out at room temperature, i.e. at a temperature of 20° C.±2° C. or at other temperatures. According to one embodiment, process step D) is carried out at substrate surface temperature from 25 to 150° C., preferably from 50 to 140° C., and more preferably from 75 to 130° C.

According to one embodiment of the present invention, process steps C) and D) are carried out two or more times using a different or the same liquid barrier layer composition.

According to one embodiment, the plastic substrate comprises a first side and a reverse side and process steps C) and D) are also carried out on the reverse side of the substrate to manufacture a packaging material being coated on the first and the reverse side. These steps may be carried out for each side separately or may be carried out on the first and the reverse side simultaneously.

According to another embodiment, the plastic substrate is a three-dimensional plastic substrate comprising an inside surface and an outside surface and process steps C) and D) are also carried out on the inside surface and outside surface of the substrate to manufacture a packaging material being coated on the inside and outside surface. These steps may be carried out for each surface separately or may be carried out on the inside and the outside surface simultaneously.

The barrier layer of the present invention formed on the plastic substrate cannot only prevent the migration of hydrophobic substances, which may be present in the plastic substrate or materials adjacent to the plastic substrate. It was also surprisingly found by the inventors that the barrier layer exhibits a reduced stickiness and thus a reduced blocking tendency, thereby allowing the package material to be easily separated. This greatly improves the processing properties and the characteristics of the packaging material.

Furthermore, the liquid barrier layer composition can be applied to the plastic substrate with a high solids content, for example, with a solids content of 20 wt.-% or more, and can include a high amount of a surface-reacted calcium carbonate and a mineral material. This can decrease the drying time of the applied barrier layer, which in turn can lower the energy consumption and reduces the time, in which the substrate is in contact with the liquid barrier layer composition, which may affect the structure of the substrate. Due to the shorter drying times, the inventive process for producing a packaging material can also be carried out on conventional production units and does not require any specific modifications. It was also found that the liquid barrier layer composition can be directly applied to the plastic substrate without further modifications (ready-to-use composition).

Moreover, it was found that the liquid barrier layer composition can be applied by means of printing or spraying. In contrast, conventional barrier coated packaging materials are typically produced by co-extrusion or lamination processes, which may require specific equipment. Thus, the present invention may provide an advantageous alternative to conventional packaging material production processes in that a barrier coating can be applied by conventional printing or spraying means. This may, for example, provide the possibility to combine the barrier layer function with decorative or informative elements on the plastic substrate. Moreover, the process of the present invention provides the possibility to equip three-dimensional packaging materials such as containers, boxes, or bottles with a barrier layer, for example, by applying the liquid barrier layer composition be means of spraying. This may be, for example, useful for PET-based bottles, which may bear the risk of leaching bisphenol A into the packed beverage.

Furthermore, the use of polymeric material is reduced, which can lower the production costs and improves the environmental sustainability and recyclability of the barrier layer. Furthermore, the inventive coating composition does not affect the quality of the packaging material.

The scope and interest of the present invention will be better understood based on the following figures and examples which are intended to illustrate certain embodiments of the present invention and are non-limitative.

EXAMPLES

I. Measurement Methods

In the following, measurement methods implemented in the examples are described.

Particle Size Distribution (Mass % Particles with a Diameter <X), $d_{50}$ (Wt) Value (Weight Median Grain Diameter) and $d_{98}$(Wt) Value of a Particulate Material:

The $d_{50}$(wt) and $d_{98}$(wt) values were measured using a Sedigraph 5120 from the company Micromeritics, USA. The method and the instrument are known to the skilled person and are commonly used to determine grain size of fillers and pigments. The measurements were carried out in an aqueous solution comprising 0.1 wt.-% $Na_4P_2O_7$. The samples were dispersed using a high speed stirrer and supersonics.

Particle Size Distribution (Volume % Particles with a Diameter <X), $d_{50}$(Vol) Value (Volume Median Grain Diameter) and $d_{98}$(Vol) Value of a Particulate Material:

Volume median grain diameter $d_{50}$(vol) was evaluated using a Malvern Mastersizer 2000 Laser Diffraction System. The $d_{50}$(vol) or $d_{98}$(vol) value, measured using a Malvern Mastersizer 2000 Laser Diffraction System, indicates a diameter value such that 50% or 98% by volume, respectively, of the particles have a diameter of less than this value. The raw data obtained by the measurement was analysed using the Mie theory, with a particle refractive index of 1.57 and an absorption index of 0.005.

Solids Content of an Aqueous Suspension

The suspension solids content (also known as "dry weight") was determined using a Moisture Analyser MJ33 from the company Mettler-Toledo, Switzerland, with the following settings: drying temperature of 160° C., automatic switch off if the mass does not change more than 1 mg over a period of 30 s, standard drying of 5 to 20 g of suspension.

Specific Surface Area (SSA)

The specific surface area was measured via the BET method according to ISO 9277 using nitrogen, following conditioning of the sample by heating at 250° C. for a period of 30 minutes. Prior to such measurements, the sample was filtered within a Büchner funnel, rinsed with deionised water and dried overnight at 90 to 100° C. in an oven. Subsequently, the dry cake was ground thoroughly in a mortar and the resulting powder placed in a moisture balance at 130° C. until a constant weight is reached.

Barrier Performance Analysis

The barrier performance was evaluated by a modified version of the n-hexan vapour transmission rate test.

In order to improve the safety at work the testing solvent of n-hexane was replaced by n-heptane, called in the following heptane vapour transmission rate (HpVTR) test. The n-heptane used in the following experiments is commercially available from Merck KGaA, Darmstadt, Germany.

Figure 1:
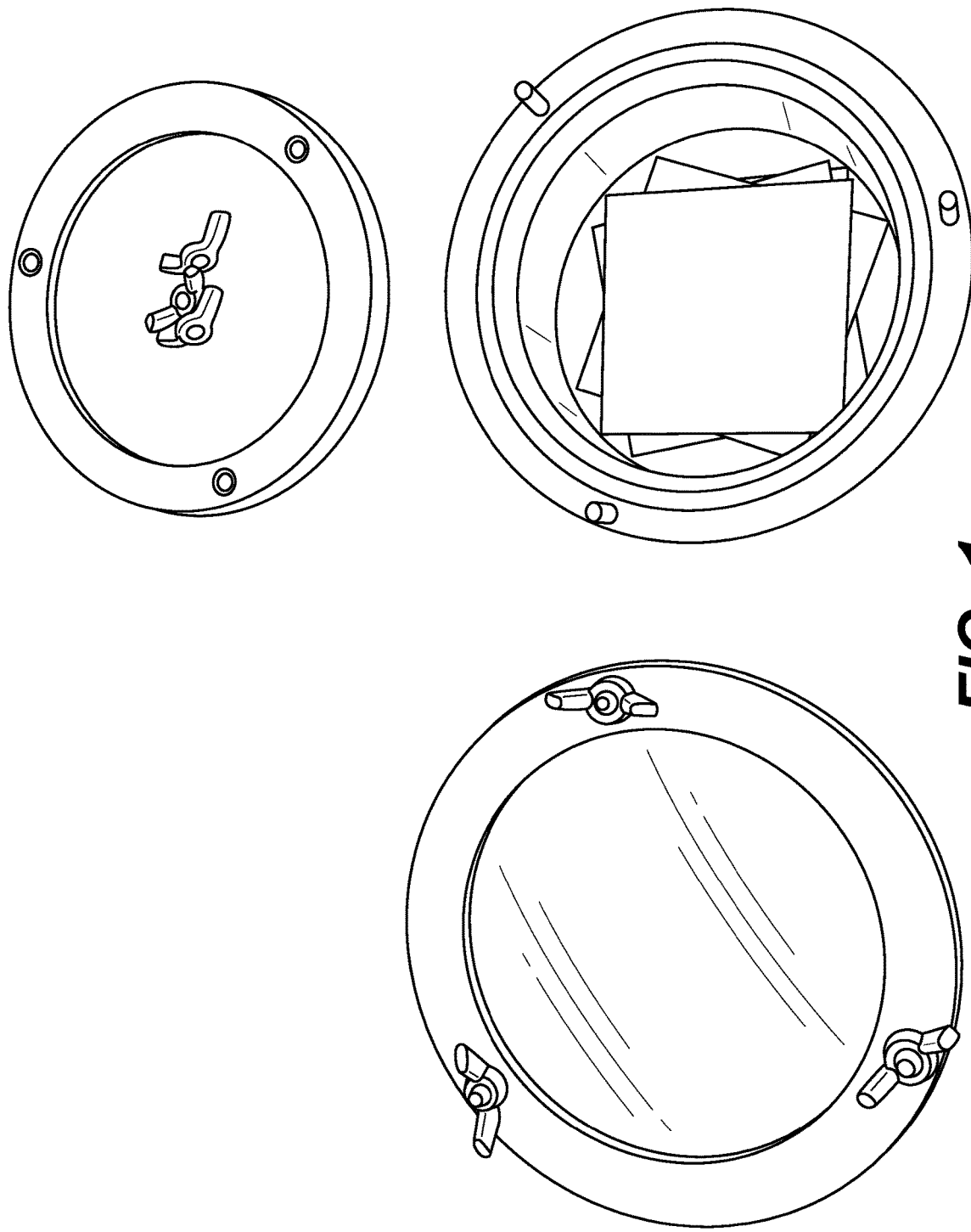
FIG. 1 is a photograph of the HpVTR cup that was used for the migration barrier performance analysis.

The gravimetric method serves to determine the HpVTR of materials with planar shape using a gastight cup (e.g. a metal chamber) and a sealable closure which is fixable. The closure itself has a defined opening. The material to be tested was put between the cup (see FIG. 1) and the closure, provided by suitable gaskets on both sides (used testing fluid may not affect the material quality of the gaskets by any means).

A defined volume of n-heptane (9 ml) was filled into the evaporation chamber. The quantity of n-heptane vapour that passed under controlled conditions through the exposed surface area of a barrier sample was measured on a defined time scale, namely, at one, four, eight, and 24 hours.

Figure 2:
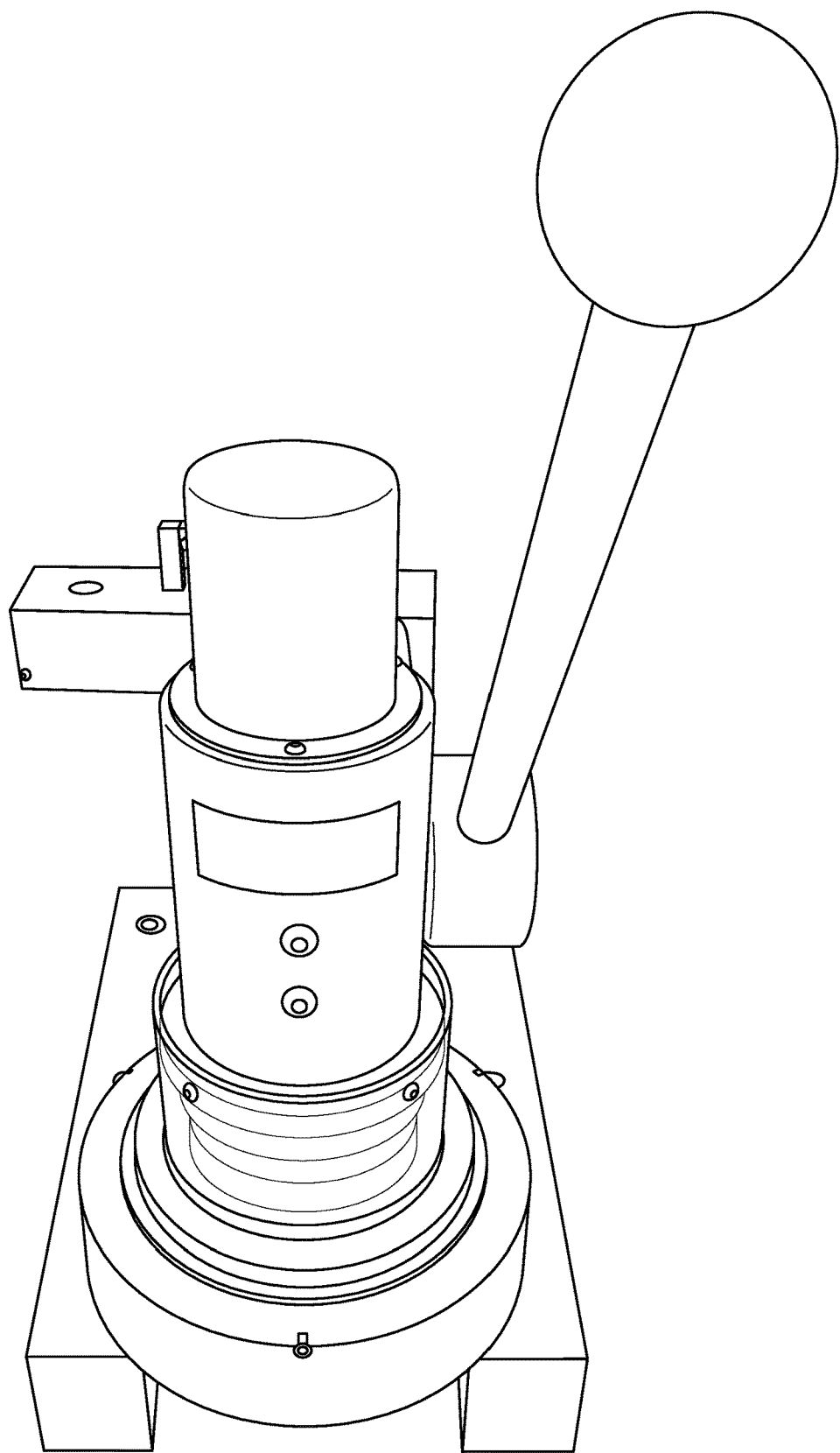
FIG. 2 is a photograph of the punch used for cutting the packaging material samples for the migration barrier performance analysis.

The most convenient way to prepare the barrier samples with a diameter of 10.0 cm was by using a template or a punch (as e.g. can be seen in FIG. 2). Prior to the test it was imminent to check the samples on surface defects like specks, crease, holes or similar irregularities. In order to gain a representative value at least three replicates per trial point were measured.

Necessary devices to conduct the HpVTR-test were a balance with a weighting accuracy of 0.1 or 1 mg and an evaporation chamber.

The test was performed in a climate controlled environment at 23° C., 50% humidity in a laboratory hood. The container was filled with n-heptane, sealed and immediately weighed, then subsequently re-weighed after one, four, eight, and 24 hours.

The data was collected as a weight loss from the starting weight, which is then calculated as loss of weight per area and time e.g. as $[g/m^2/d]$. The heptane vapour transmission rate (HpVTR) of interest was calculated once a steady state of transmission was achieved. For most packaging materials tested it can be observed that steady state is reached in between 4 hours and 1 day.

After reaching aforementioned steady state conditions, a stable and reproducible level of the heptane vapour transmission rate (HpVTR) can be measured.

Weight Analysis

The weight of the evaporation chambers within the HpTVR evaluation was determined with a lab scale an accuracy of +/−0.0001 g). In this case the lab balance "Mettler AE260 Delta Range" from Mettler Toledo (Schweiz) AG, Nänikon, Switzerland was used.

Thickness Analysis

The thickness of the samples was measured according "Thickness" (DIN EN 20 534). The samples were conditioned for 48 hours. The thickness was determined by using a micrometer with a test pressure of 10 $N/cm^2$. The test result was found by taking the average of 10 measurements. The measured thickness value is indicated in μm. For this purpose the thickness measuring instrument "LTM" from the company ABB Automation, Mannheim, Germany was used.

II. Materials

Substrate

BOPP: Biaxially oriented polypropylene film, translucent, thickness 20 μm, corona surface treated and having a surface tension of 40 mN/m (available from Jakob Benn & Söhne GmbH, Hanau, Germany).

PE: Polyethylene film, translucent, thickness 40 μm, corona surface treated and having a surface tension of 40 mN/m (available from Constantia Folien + Druck GmbH, Fernwald-Steinbach, Germany).

Surface-Reacted Calcium Carbonate (SRCC)

SRCC: Surface-reacted calcium carbonate that is commercially available from Omya AG, Switzerland. SRCC has a rose type structure and the following properties: $d_{50}$(vol)= 1.3 μm; $d_{98}$(vol)=5 μm; BET SSA=45 $m^2/g$; The intraparticle intruded specific pore volume is 0.18 $cm^3/g$ (for the pore diameter range of 0.004 to 0.09 μm).

Mineral Material (MM)

MM: Natural ground calcium carbonate (marble): $d_{50}$ (wt)=1.5 μm; $d_{98}$(wt)=10 μm; solids content 78 wt.-% (available from Omya AG, Switzerland).

Copolymer

The copolymer used in the following experiments was prepared according to Example 4 of WO 2013/083504 A1.

A reactor was purged with nitrogen and 427.1 g of demineralized water and maltodextrin (C Dry MD 01915 (94.7% strength); Cargill) was added in an amount of 30 pphm (weight parts per hundred weight parts of monomers). The mixture in the initial charge was heated to 86° C. Then, 3.2 g of sodium peroxodisulphate (7% strength) were added before stirring for 5 minutes. The emulsion feed consisting of 180.0 g of water, 20.0 g of emulsifier (Dowfax® 2A1, 45% strength) and 450.0 g of a monomer mixture of 55 wt.-% ethyl acrylate, 44 wt.-% methyl methacrylate, and 1 wt.-% acrylic acid was metered into the reactor over 2 hours. Concurrently with the emulsion feed the initiator feed was started (12.9 g of sodium peroxodisulphate, 7% strength) and likewise metered in over 2 hours. After the emulsion feed has ended, the system was allowed to polymerize for 45 min. The reactor was then cooled down to room temperature.

The resulting dispersion had a solids content of 47 wt.-% and the obtained polymer had a $T_g$ of 30° C.

Defoamer

The defoamer "Foamaster® WO 2310" used in the following experiments is commercially available from BASF, Ludwigshafen, Germany. The formulation is based on white oil and non-ionic surfactants.

Rheology Modifier

The Rheology modifier "Sterocol FS" used in the following experiments is commercially available from BASF, Ludwigshafen, Germany.

III. Experiments

Sample Preparation

The performance of the prepared barrier layers against the migration of mineral oils was tested by the n-heptane vapour transmission rate (HpVTR) test comparing the loss of testing liquid.

Two different barrier layer A and B were tested:

Composition A: 80 wt.-% copolymer, 16 wt.-% MM, 4 wt.-% SRCC, 0.2 wt.-% defoamer, and 0.15 wt.-% rheology modifier, wherein the wt.-% is based on the total weight of composition A.

Composition B: 40 wt.-% copolymer, 48 wt.-% MM, 12 wt.-% SRCC, 0.2 wt.-% defoamer, and 0.15 wt.-% rheology modifier, wherein the wt.-% is based on the total weight of composition B.

The corresponding liquid barrier layer compositions were prepared as follows:

In a 2 litres beaker, the copolymer dispersion was provided at a pH of 8.5, which was adjusted using a 30% NaOH solution. Subsequently, the mixture of surface-reacted calcium carbonate and mineral material was added under vigorous stirring at 500 rpm for 10 min with a Pendraulik laboratory dissolver of the LD 50 type, from Pendraulik GmbH, Springe, Germany.

Finally, the defoamer and the rheology modifier were incorporated.

For continuous adding of 0.2 parts (active substance on final dry product) of the defoamer over a period of one minute, the dissolver was set on 930 rpm. At the same stirring speed the blend was homogenized for a period of 1 min after dosage.

The rheology modifier was added in an amount of 0.15 parts (active substance on final dry product) over a time span of one minute and 930 rpm and homogenized for 2 min at the same speed.

The resulting composition A was flexo-printed on the plastic substrates with help of the laboratory printing machine "testacolor tfm-157-2" from the company Norbert Schläfli Maschinen, Zofingen, Switzerland.

The liquid barrier layer compositions were applied by means of two identical printing units, if not otherwise indicated.

Each of the two printing units was equipped by:

Anilox roll from Praxair Surface Technologies S.A., Meyrin, Switzerland, with the following general specifications:
Screen: 120 lines/cm
Screen angel: 60°
URMI volume: 15.2 $cm^3/m^2$ Flexo sleeve "WS 746 70" from Felix Böttcher GmbH & Co. KG, Cologne, Germany, with the following general specifications:
Material: EPDM (ethylene-propylene-diene-monomer)
Material density: 1.11 $g/cm^3$
Hardness Shore A: 70

The laboratory print test machine "testacolor tfm-157-2" was designed with the focus to generate results in lab-scale correlating to printing presses in production scale. Solely, the print speed of the lab machine differed significantly.

The applied quantity of the liquid barrier layer compositions from an anilox roll via the blanket finally to the substrates depended on various factors. Usually, a transfer rate of approximately 50% from the anilox roll to the sleeve and approximately 40% to the substrate can be expected for the first print unit, whereas the transfer to the substrate in the second print unit is typically lower.

TABLE 1

| Printing conditions. | | | | | |
|---|---|---|---|---|---|
| BOPP | | | PE | | |
| Solids | [%] | 52.0% | Solids | [%] | 52.0% |
| Density | [g/cm³] | 1.17 | Density | [g/cm³] | 1.17 |
| 1st Print Unit Anilox reel | | | 1st Print Unit Anilox reel | | |
| Volume | [g/cm³] | 15.2 | Volume | [g/cm³] | 15.2 |
| Transfer Rate | [%] | 50.0% | Transfer Rate | [%] | 50.0% |
| Sleeve | | | Sleeve | | |
| Transfer Rate | [%] | 37.0% | Transfer Rate | [%] | 60.0% |
| Application Weight | [g/m²] | 1.7 | Application Weight | [g/m²] | 2.8 |
| Film Thickness | [μm] | 1.5 | Film Thickness | [μm] | 2.4 |

TABLE 1-continued

| Printing conditions. | | | | | |
|---|---|---|---|---|---|
| 2nd Print Unit Anilox reel | | | 2nd Print Unit Anilox reel | | |
| Volume | [g/cm³] | 15.2 | Volume | [g/cm³] | 15.2 |
| Transfer Rate | [%] | 50.0% | Transfer Rate | [%] | 50.0% |
| Sleeve | | | Sleeve | | |
| Transfer Rate | [%] | 30.0% | Transfer Rate | [%] | 3.0% |
| Application Weight | [g/m²] | 1.4 | Application Weight | [g/m²] | 0.1 |
| Film Thickness | [µm] | 1.2 | Film Thickness | [µm] | 0.1 |
| Final Product | | | Final Product | | |
| Application Weight | [g/m²] | 3.1 | Application Weight | [g/m²] | 2.9 |
| Film Thickness | [µm] | 2.6 | Film Thickness | [µm] | 2.5 |

With help of said printing machine a homogeneous, flawless and continuous film of the liquid barrier layer composition was applied on the plastic substrates.

Alternatively, the liquid barrier layer compositions A and B, respectively, were applied onto the plastic substrates by means of spraying, whereas spraying means the even distribution of the medium, namely the liquid barrier layer composition, through a nozzle onto the substrate. The application of the liquid barrier layer compositions onto the substrate was conducted in a spray booth from the company "Straumann AG", 8154 Oberglatt, Switzerland. This spray booth was equipped with a dry dust collector system and heatable fresh air. For the application itself, an airgun from the company "DeVilbiss", "GTI-G110 Trans-Tech gravity feed cup" and a nozzle of 1.5 mm in diameter and a paint needle of 0.85-1.5 mm and initial pressure of 2.5 bar was used. The solids content of the liquid barrier layer composition was 52 wt.-%.

After application, the wet barrier layers were dried in a drying oven from the company "Binder", 78532 Tuttlingen, Germany put on 75° C. for 10 minutes in order to evaporate the inheriting water of the liquid barrier layer composition and to initiate and finalize the film formation of the copolymer.

The prepared samples are compiled in Table 2 below:

TABLE 2

| Composition of prepared samples. | | | |
|---|---|---|---|
| Sample | Substrate | Barrier Solution [wt %] | Application |
| 1 (comparative) | BOPP | A | — |
| 2 | BOPP | A | 1 printing unit |
| 3 | BOPP | A | 2 printing units |
| 4 (comparative) | PE | A | — |

TABLE 2-continued

| Composition of prepared samples. | | | |
|---|---|---|---|
| Sample | Substrate | Barrier Solution [wt %] | Application |
| 5 | PE | A | 1 printing unit |
| 6 | PE | A | 2 printing units |
| 7 | BOPP | A | Spray |
| 8 | BOPP | B | Spray |
| 9 | PE | A | Spray |
| 10 | PE | B | Spray |

Results

The thereof printed/sprayed and dried samples have been cut into round samples for the following barrier performance test (HpVTR).

The following results have been obtained at the samples whereas values of less than 40 g/m²/d are commonly accepted as having a sufficient barrier performance

TABLE 3

| Results of barrier performance test. | | | | | | | | | | | |
|---|---|---|---|---|---|---|---|---|---|---|---|
| Sample | unit | 1 | 2 | 3 | 4 | 5 | 6 | 7 | 8 | 9 | 10 |
| Grammage | g/m² | 17.9 | 19.6 | 21.0 | 37.4 | 40.2 | 40.3 | 111.0 | 119.0 | 135.7 | 152.9 |
| Barrier layer weight (dry weight) | g/m² | 0.0 | 1.7 | 3.1 | 0.0 | 2.8 | 2.9 | 93.1 | 101.1 | 98.3 | 115.5 |
| HpVTR 1 h | g/m² | 29.7 | 5.4 | 0.7 | 19.5 | 0.7 | 0.4 | 0.5 | 0.5 | 0.4 | 0.5 |
| HpVTR 4 h | g/m² | 125.0 | 22.9 | 1.4 | 78.9 | 1.9 | 0.4 | 0.6 | 0.7 | 0.5 | 0.7 |
| HpVTR 8 h | g/m² | 189.7 | 44.7 | 3.2 | 159.9 | 3.7 | 0.7 | 0.6 | 0.7 | 0.5 | 0.7 |
| HpVTR 24 h | g/m² | 330.3 | 128.3 | 8.2 | 461.9 | 10.3 | 1.6 | 0.6 | 0.8 | 0.5 | 1.1 |
| Result barrier performance test | | Failed | Failed | Passed | Failed | Passed | Passed | Passed | Passed | Passed | Passed |

CONCLUSION

As it is clearly shown by the obtained results, the application of the liquid barrier layer composition either by way of spraying or printing creates a functioning barrier layer against the migration of hydrophobic substances, and especially against the migration of mineral oils.

By applying a dry barrier layer weight by means of printing of more than 2.0 g/m², such as of 2.5 g/m² (gsm) and more, a sufficient barrier against the migration of hydrophobic substances can be generated on BOPP film as well as on PE film to limit the possible migration to the desired threshold level of less than 40 g/m²/d of n-heptane. 40 gsm/m²/d of n-heptane are corresponding to a migration level of less than 2 mg/kg food stuff of MOSH and less than 0.5 mg/kg food stuff of MOAH.

Furthermore, it was shown that spraying is also a reasonable way to create a functioning barrier layer.

The invention claimed is:
1. A packaging material comprising
   a plastic substrate comprising at least one surface, and
   a barrier layer for hydrophobic substances, wherein the barrier layer is in contact with the at least one surface of the plastic substrate, and
   wherein the barrier layer comprises
   (I) a copolymer obtained by emulsion polymerization of
      (i) one or more principal monomers selected from the group consisting of $C_1$-$C_4$ alkyl (meth)acrylates, and
      (ii) 0.1 to 5 wt.-% of one or more acid monomers,
      wherein the glass transition temperature $T_g$ of the copolymer is from −10 to 70° C., and the emulsion polymerization is carried out in an aqueous medium in the presence of at least one carbohydrate compound,
   (II) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
   (III) a mineral material selected from natural ground calcium carbonate and/or precipitated calcium carbonate,
   wherein the weight ratio of the surface-reacted calcium carbonate to the mineral material is from 1:8 to 1:2,
   wherein the barrier layer has a Heptane Vapour Transmission Rate (HpVTR) of no more than 10.3 g/m²/d,
   wherein the barrier layer has a layer weight of at least 2 g/m².

2. The packaging material of claim 1, wherein the plastic substrate is a plastic film, a plastic sheet, a plastic foil, a semi-rigid plastic container, or a rigid plastic container.

3. The packaging material of claim 1, wherein the plastic substrate comprises a polyethylene, a polypropylene, a polyester, a polyvinylchloride, a poly(tetrafluoro ethylene), a polyalkylene terephthalate, a polyalkylene furandicarboxylate, a polycarbonate, a polystyrene, a melamine formaldehyde, a polylactic acid, a plastarch material, a polyhydroxyalkanoate, a polybutylene succinate, a polycaprolactone, a polyanhydride, a polyvinyl alcohol, a cellophane, a cellulose ester, a silicone, or a mixture thereof.

4. The packaging material of claim 1, wherein the glass transition temperature $T_g$ of the copolymer is from 0 to 60° C.

5. The packaging material of claim 1, wherein the barrier layer comprises the copolymer in an amount from 40 to 99.9 wt.-%, based on the total weight of the barrier layer.

6. The packaging material of claim 1, wherein the copolymer is obtained by emulsion polymerization of
   (i) one or more principal monomers selected from the group consisting of $C_1$-$C_4$ alkyl (meth)acrylates,
   (ii) 0.1 to 5 wt.-% of one or more acid monomers, based on the total weight of all monomers,
   (iii) 0 to 20 wt.-% of acrylonitrile, based on the total weight of all monomers, and
   (iv) 0 to 10 wt.-% of further monomers other than the monomers (i) to (iii), based on the total weight of all monomers.

7. The packaging material of claim 6, wherein
   the one or more principal monomers (i) are selected from the group consisting of methyl acrylate, methyl methacrylate, ethyl acrylate, n-butyl acrylate, and mixtures thereof, and/or
   the one or more acid monomers (ii) are selected from acrylic acid, methacrylic acid, itaconic acid, maleic acid, fumaric acid, and mixtures thereof, and/or
   the further monomers (iv) are selected from the group consisting of $C_5$-$C_{20}$ alkyl (meth)acrylates, vinyl esters of carboxylic acids comprising up to 20 carbon atoms, vinylaromatics having up to 20 carbon atoms, ethylenically unsaturated nitriles other than acrylonitrile, vinyl halides, vinyl ethers of alcohols comprising 1 to 10 carbon atoms, aliphatic hydrocarbons having 2 to 8 carbon atoms and one or two double bonds, and mixtures thereof.

8. The packaging material of claim 1, wherein the surface-reacted calcium carbonate has a specific surface area of from 20 m²/g to 200 m²/g, measured using nitrogen and the BET method according to ISO 9277.

9. The packaging material of claim 1, wherein the surface-reacted calcium carbonate is in form of particles having a volume median particle size $d_{50}$ from 0.1 to 50 μm.

10. The packaging material of claim 1, wherein the mineral material is natural ground calcium carbonate.

11. The packaging material of claim 1, wherein the mineral material is in form of particles having a weight median particle size $d_{50}$ from 0.01 to 15 μm.

12. The packaging material of claim 1, wherein the barrier layer comprises the combination of the surface-reacted calcium carbonate and the mineral material in an amount of from 0.1 to 60 wt.-%, based on the total weight of the barrier layer.

13. The packaging material of claim 1, wherein the weight ratio of the surface-reacted calcium carbonate to the mineral material is from 1:7 to 1:3.

14. The packaging material of claim 1, wherein the barrier layer has a layer weight of at least 2.5 g/m².

15. The packaging material of claim 1, wherein the hydrophobic substances comprise mineral oils, plasticizers, hydrophobic contaminants, bisphenol A (BPA), bis (2-ethylhexyl) phthalate (DEHP), nonylphenol monoethoxylate (NMP), nonylphenol diethoxylate (NDP), diisopropylnaphthalene, mineral oil saturated hydrocarbons (MOSH), polyolefine oil saturated hydrocarbons (POSH), mineral aromatic hydrocarbons (MOAH), alkanes, naphthenes, or mixtures thereof.

16. The packaging material of claim 1, wherein the packaging material is a food packaging, a medical device packaging, a pharmaceutical packaging, a flexible packaging, a pallet, a shrink wrap, a plastic wrap, an overwrap, a freezer bag, a vacuum bag, a fast food wrapper, a food bag, a snack bag, a grocery bag, an ovenable food container, a cup, a tray, a box, a folding box, a clamp, a can, a bottle, a liquid container, a beverage container, a rigid medical thermoform, a protective medical packaging, a pouch, a bag, a tray, a lid, a blister pack, a skin pack, or an insert.

17. The packaging material of claim 1, wherein the packaging material is suitable for use in food packaging applications, medical device packaging applications, or pharmaceutical packaging applications.

18. A method for producing a packaging material, comprising the steps of:
   A) providing a plastic substrate comprising at least one surface,
   B) providing a liquid barrier layer composition, C) applying the liquid barrier layer composition onto the at least one surface of the plastic substrate to form a barrier layer for hydrophobic substances, and
D) drying the barrier layer,
wherein the liquid barrier layer composition comprises
   (I) a copolymer obtained by emulsion polymerization of
      (i) one or more principal monomers selected from the group consisting of $C_1$-$C_4$ alkyl (meth)acrylates, and
      (ii) 0.1 to 5 wt.-% of one or more acid monomers,
   wherein the glass transition temperature $T_g$ of the copolymer is from −10 to 70° C., and the emulsion polymerization is carried out in an aqueous medium in the presence of at least one carbohydrate compound,
   (II) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
   (III) a mineral material selected from natural ground calcium carbonate and/or precipitated calcium carbonate,
   wherein the weight ratio of the surface-reacted calcium carbonate to the mineral material is from 1:8 to 1:2, wherein the barrier layer has a Heptane Vapour Transmission Rate (HpVTR) of no more than 10.3 g/m²/d, wherein the barrier layer has a layer weight of at least 2 g/m².

19. The method of claim 18, wherein in step C) the liquid barrier layer composition is applied using a spray technique, a printing technique, spray coating, screen printing, flexographic printing, inkjet printing, offset printing, rotogravure printing, tampon printing, and combinations thereof.

20. The method of claim 18, wherein step C) is carried out at a surface temperature of the plastic substrate from 10 to 100° C.

21. The method of claim 18, wherein the liquid barrier layer composition of step B) is an aqueous liquid barrier layer composition.

22. A barrier layer, wherein the barrier layer is suitable for use in a plastic substrate, wherein the barrier layer prevents migration of hydrophobic substances, and wherein the barrier layer comprises
   (I) a copolymer obtained by emulsion polymerization of
      (i) one or more principal monomers selected from the group consisting of $C_1$-$C_4$ alkyl (meth)acrylates, and
      (ii) 0.1 to 5 wt.-% of one or more acid monomers,
   wherein the glass transition temperature $T_g$ of the copolymer is from −10 to 70° C., and the emulsion polymerization is carried out in an aqueous medium in the presence of at least one carbohydrate compound,
   (II) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
   (III) a mineral material selected from natural ground calcium carbonate and/or precipitated calcium carbonate,
   wherein the weight ratio of the surface-reacted calcium carbonate to the mineral material is from 1:8 to 1:2, wherein the barrier layer has a Heptane Vapour Transmission Rate (HpVTR) of no more than 10.3 g/m²/d, wherein the barrier layer has a layer weight of at least 2 g/m².

* * * * *